United States Patent [19]

Fujisaki et al.

[11] Patent Number: 4,794,293
[45] Date of Patent: Dec. 27, 1988

[54] DIRECT CURRENT ELECTRIC MOTOR

[76] Inventors: Kiyonori Fujisaki, 195-4 Ooyaguchi, Matsudo-shi, Chiba-ken; Toshio Kobayashi, 6-1-13 Kitakarasuyama, Setagaya-ku, Tokyo; Heihachi Kato, 232 Terao, Kawagoe-shi, Saitama-ken, all of Japan

[21] Appl. No.: 853,226

[22] Filed: Apr. 17, 1986

[30] Foreign Application Priority Data

Aug. 20, 1985 [JP] Japan ................................ 60-183236

[51] Int. Cl.$^4$ ............................................. H02K 1/22
[52] U.S. Cl. .................................. 310/268; 310/68 R
[58] Field of Search ............................. 310/68 R, 268

[56] References Cited

U.S. PATENT DOCUMENTS

| | | | |
|---|---|---|---|
| 4,093,897 | 6/1978 | Fujita | 310/268 X |
| 4,220,879 | 9/1980 | Hoshimi | 310/268 X |
| 4,242,608 | 12/1980 | Ishigaki et al. | 310/268 X |
| 4,283,644 | 8/1981 | Kondo et al. | 310/268 X |
| 4,340,833 | 7/1982 | Sudo et al. | 310/268 |
| 4,604,540 | 8/1986 | Fukami | 310/268 X |

Primary Examiner—Mark O. Budd
Attorney, Agent, or Firm—Robert F. Ziems

[57] ABSTRACT

A direct current electric motor is described, which substantially comprises a permanent magnet having a plurality of N-magnetic poles and a plurality of S-magnetic poles, the N and S-magnetic poles being alternately arranged adjacent to each other, each defining a magnetic range of its own; phase coil means including a first phase coil and a second phase coil, each being composed of a plurality of groups of conductors, the conductors being extended substantially in parallel with each other, the first and second coils being displaced by a half range of a single magnetic pole of the permanent magnet, such that each group of conductors of the first phase coil and each group of conductors of the second phase coil may be alternately disposed adjacent to each other, one being disposed in one half of the magnetic range and the other being disposed in the other half thereof; and magnetism detector means including a first magnetism detector and a second magnetism detector, the first magnetism detector being connected to an end of the first phase coil and the second magnetism detector being connected to an end of the second phase coil, the first and second magnetism detectors and the first and second phase coils forming an armature to be positioned opposite to the permanent magnet movable with respect to the armature with a predetermined amount of air gap provided therebetween.

12 Claims, 10 Drawing Sheets

DIRECT CURRENT ELECTRIC MOTOR

BACKGROUND OF THE INVENTION

The invention relates to a direct current electric motor, and more particularly relates to an arrangement of a permanent magnet and an armature of the motor in which the permanent magnet has a plurality of N-magnetic poles and a plurality of S-magnetic poles, each pole defining a magnetic range of its own and the armature is composed of a first phase coil and a second phase coil each including a plurality of groups of conductors, the conductors in each group being extended substantially in prallel with each other, instead of being bundled together, each group of conductors of the first phase coil and each group of conductors of the second phase coil being alternately arranged adjacent to each other, one being disposed in one half of the magnetic range of the permanent magnet and the other being disposed in the other half of the magnetic range, so as to produce a constant torque in each half of the magnetic range. In this connection, the conductors of the first and second phase coils are wholly utilized to produce a constant torque in each half of the magnetic range for smoothly driving the motor with a comparatively high voltage and a small amount of double phase full wave current with a high torque and with a remarkably reduced consumption of electric power.

So far the coplanar opposed-type slotless motor using a stator coil arrangement 3 as shown in FIG. 13 has been generally employed to drive the magnetic tape in the acoustic and/or reflection apparatuses and also to drive the floppy disc in the various data processing apparatuses. Such a stator coil arrangement 3 has a number of first and second shunt coils 1,2 arranged in a common plane, the coils being generally less in number than the number of the magnetic poles provided on a permanent magnet, and moreover comparatively large spaces 4 are provided between the coils. In this case, if the number of coils is increased, the layers of coils are increased and accordingly the thickness is increased in the axial direction. As the result, the air gap is increased between the iron base plate 5 and the permanent magnet, thus reducing the density of magnetic flux to deteriorate the torque effect. Therefore in order to obtain a desired output in such a stator coil arrangement 3, it is required to increase the torque produced by each of the coils 1 and 2. This is generally attained by using a considerably thick wire as the conductors C, so that a considerable amount of current may flow through the conductors. However this will inevitably result in the dimensional enlargement of the motor and in the increase of power consumption. Such a motor has never been usable in the apparatus such as a portable video recorder operated by the dry element cells.

In order to overcome the defects and disadvantages of the stator coil arrangement 3 as shown in FIG. 13, there has been proposed another type of stator coil arrangement 8 as shown in FIG. 14. This is so called a flat and overlapped type of zigzag coil arrangement, in which a pair of zigzag coils 6,6 are arranged in combination as shown, each being composed of a group of effective conductors 6a which are alternately disposed as being overlapped with each other. This structure will actually prevent the increase of air gap provided between a permanent magnet and an iron plate of the magnetic circuit of the stator and realize a high density of magnetic flux as introduced in a publication under the title "DC Servo Motor For Mechatronics" the 3rd edition, pages 112-125 issued by Sogo Denshi (Electronics) Publisher, and a publication under the title "National Technical Report" the 26th volume, 5th issue, pages 774-782.

However this zigzag type of coil arrangement 8 still includes various defects to be further improved. Namely since the conductors C of each zigzag coil 6 are bundled together, the effective portion 6a of conductors for actually producing a torque is smaller with respect to the magnetic range defined by each magnetic pole of the permanent magnet, and on the other hand the portions 6b,6c of conductors ineffective to produce the torque are comparatively larger, and therefore the torque generation rate is lower and also the torque variation is higher resulting in the increase of power consumption. Further in case of the differential double phase full wave drive, the motor will have vibrations generated in the axial direction which may deteriorate the N and S-magnetic effects. Further in case of the sine wave drive in which the wave form of Hall generators to be employed will directly become the wave form for driving the motor, the disorder of the Hall generators, such as the variations in the DC offset and sensitivity of the Hall generators will considerably deteriorate the wow flutter. It is required to make a precise adjustment of the DC offset and sensitivity of the Hall generators in order to attain a normal performnce, as stated in the publication "National Technical Report" as mentioned above. In order to solve such a problem, the publication teaches to employ a specific, however, complex system introduced as a "current distribution double phase full wave drive system" which requires so many electronic circuits including so many elements.

OBJECTS AND SUMMARY OF THE INVENTION

The invention has been provided to eliminate the defects and disadvantages of the prior art. It is therefore a primary object of the invention to provide a permanent magnet having a plurality of N-magnetic poles and a plurality of S-magnetic poles, each defining a magnetic range of its own and first and second phase coils each composed of a plurality of groups of conductors, the conductors in each group being extended substantially in parallel with each other, each group of conductors of the first phase coil and each group of the second phase coil being alternately arranged adjacent to each other, one being disposed in one half of the magnetic range and the other being disposed in the other half thereof, so as to produce a constant torque in each half of the magnetic range for smoothly driving the motor. It is another object of the invention to provide a maximum portion of each group of conductors which may be effective to produce a torque and a minimum portion of each group of conductors which may be ineffective to produce a torque, so as to drive the motor with a comparatively high voltage and a small amount of current by way of an easily obtained differential double phase full wave drive system. It is another object of the invention thus to provide a small sized direct current electric motor driven smoothly with a high torque with a remarkably reduced consumption of electric power. It is another object of the invention to arrange the first and second phase coils in which the groups of conductors of both coils are alternately disposed as displaced by the electric angle 90° so as to make the armature flat to the maximum degree to thereby provide a minimum amount of air gap between the permanent magnet and a magnetizable base to which the armature is secured; It is another object of the invention to secure the armature to the magnetizable base with an eddy-current suppressor plate being inserted therebetween, the eddy-current suppressor plate being made of a magnetizable material having a comparatively high intrinsic resistance, so as to prevent the eddy-current which may otherwise be produced in the groups of conductors of the first and second phase coils and simultaneously to highten a torque and reduce the power consumption. It is another object of the invention to form the eddy-current suppressor plate by coaxially winding up or laminating a silicon steel lamination providing a radially extended lamination layer which may be suitable for a flat-type of direct current motor effectively driven without having the undesired eddy-current which may otherwise be produced in the armature; It is still another object of the invention to provide the arrangement of the permanent magnet, the armature and/or the eddy-current suppressor plate, which may be used in the direct current electric motor of flat type, inner rotor type or linear type.

In short, the invention comprises a permanent magnet having a plurality of N-magnetic poles and a plurality of S-magnetic poles arranged thereon, the N and S-magnetic poles being alternately arranged adjacent to each other, each defining a magnetic range of its own; phase coil means including a first phase coil and a second phase coil, each being composed of a plurality of groups of conductors, the conductors in each group being extended substantially in parallel with each other, the first and second phase coils being displaced by a half range of a single magnetic pole of the permanent magnet, such that each group of conductors of the first phase coil and each group of conductors of the second phase coil may be alternately disposed adjacent to each other, one being disposed in one half of the magnetic range and the other being disposed in the other half thereof; and magnetism detector means including a first magnetism detector and a second magnetism detector, the first magnetism detector being connected to an end of the first phase coil and the second magnetism detector being connected to a end of the second phase coil, wherein the first and second magnetism detectors and the first and second phase coils form an armature to be positioned opposite to the permanent magnet with a predetermined amount of air gap provided therebetween.

Another aspect of the invention further comprises a base of a magnetizable material for securing thereto the armature and an eddy-current suppressor plate of a magnetizable material having a comparatively high intrinsic resistance, the eddy-current suppressor plate being inserted between the armature and the base.

Another aspect of the invention includes the eddy-current suppressor plate which may be formed with a lamination of a magnetizable material such as a silicon steel, the lamination being coaxially wound up or laminated to provide a radially extended lamination layer.

Another aspect of the invention includes the permanent magnet which may be formed into a cylinder, the eddy-current suppressor plate which may be formed into a cylinder and arranged as coaxial with the permanent magnet with a predetermined amount of air gap provided therebetween and the base which may be formed into a cylinder for coaxially securing thereto the armature by way of the cylindrical eddy-current suppressor plate being inserted therebetween.

Another aspect of the invention includes the permanent magnet which may be made linear and the armature which may be made linear and arranged opposite to the linear permanent magnet with a predetermined amount of air gap provided therebetween, the armature being secured to the base of a magnetizable material by way of the eddy-current suppressor plate being inserted therebetween.

Other features and advantages of the invention will be apparent from the following description of preferred embodiments in reference to the attached drawings.

BRIEF DESCRIPTION OF THE INVENTION

DETAILED DESCRIPTION OF THE INVENTION

Figure 1:
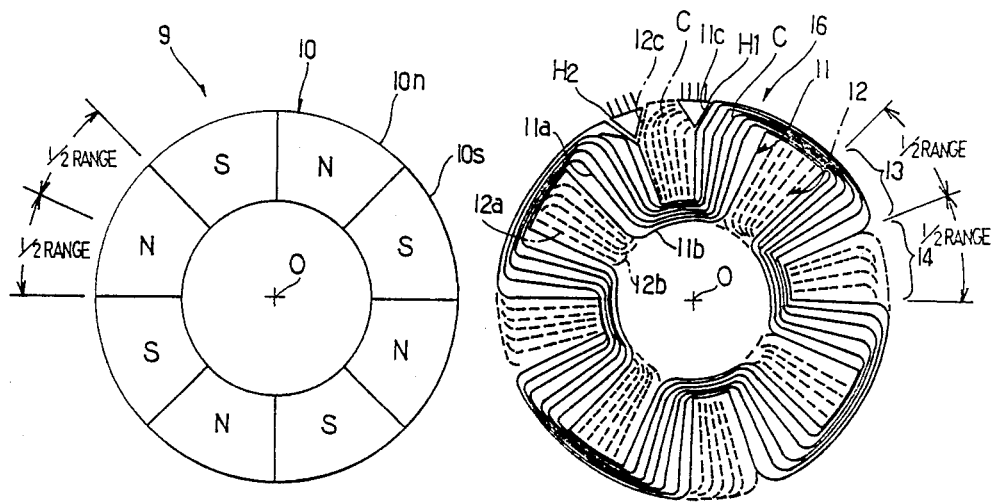
FIG. 1 represents explanatory plan views of a permanent magnet and an armature arranged side by side for a direct current electric motor.

In reference to FIG. 1, the components 9 of a direct current electric motor of the invention are composed of a permanent magnet 10, a first phase coil 11, a second phase coil 12, a first magnetism detector $H_1$, and a second magnetism detector $H_2$. The permanent magnet 10 is ring shaped with a center axis O and has a predetermined number of N-magnetic poles N and a predetermined number of S-magnetic poles S provided therearound, both of the N and S-magnetic poles being alternately arranged adjacent to each other.

The first phase coil 11 is composed of a plurality of groups 13 of conductors C, the conductors of each group being extended along generally radial lines adjacent with each other in a half range of each division defined by each of N and S-magnetic poles $10_n$, $10_s$ as illustrated with solid lines. More precisely, the conductors C of each group are disposed within the range of electric angle 90° in a manner as extended along generally radial lines adjacent with each other with a predetermined space provided therebetween without being bundled together. As shown, the first phase coil 11 is as a whole formed up in a zigzag shape. Here it is to be noted that because the conductors C are not bundled together as are in the conductors the conventional art, linear segments or portions 11a of the conductors C, which are effective to produce a torque, are substantially longer than conventional while the portions 11b of the conductors C, which are ineffective to produce the torque are considerably smaller than conventional. Also, as may be seen in FIG. 1, each of the linear segments 11a are spaced and radially oriented but more generally oriented to be transverse to the direction of relative movement between the conductors C and the permanent magnet 10.

The second phase coil 12 is formed in the same manner as the first phase coil 11 and is composed of a plurality of linear segment groups 14 of the conductors C as illustrated by the broken lines which are formed up in a zigzag shape. Each of the conductor linear segment groups 14 is located in the half range of a single magnetic pole $10_n$ or $10_s$ of the permanent magnet 10, each adjacent to the alternate one of the conductor groups 13 of the first phase coil 11.

As the first magnetism detector $H_1$, a Hall generator is used by way of example, and is secured to the end 11c of the first phase coil 11. Another Hall generator as the second magnetism detector $H_2$ is secured to the end 12c of the second phase coil 12.

Thus the first phase coil 11 and the second phase coil 12 are coaxially arranged as being angularly displaced to each other by the half range of a single magnetic pole $10_n$ or $10_s$ of the permanent magnet 10 such that the group 13 and 14 with the effective linear segment conductor portions 11a and 12a are alternately located each adjacent to the other in each magnetic pole $10_n$ or $10_s$ all through the range of 360° the permanent magnet 10. In this way, an extremely thin armature 16 is provided by the first and second phase coils 11 and 12 and the first and second magnetism detectors $H_1$ nad $H_2$ which are combined to each other as mentioned.

In a direct current electric motor of the invention, the armature 16 is arranged coaxially with the permanent magnet 10 with an air gap, i.e., a clearance of a predetermined distance provided therebetween.

The first and second phase coils 11 and 12 may be the windings of enamel wire wound up as shown in FIG. 1 by means of a wire winding machine, or may be the printed coils having the copper provided thereon as electrolyzed by means of electrolytic or non-electrolytic plating.

Further in reference to FIG. 2, a first motor embodiment of the invention will be described with the same reference numerals being used with respect to the parts common to those of the components shown in FIG. 1.

A direct current electric motor 19 of flat-type of the first motor embodiment is composed of the ring shaped permanent magnet 10 having a plurality of divisions defined by N and S magnetic poles $10_n$, $10_s$ which are alternately arranged all through 360° of the magnet, and the armature 16 composed of the first phase coil 11 having a plurality of groups 13 of conductors C with their individual linear segments 11a extending along generally radial lines adjacent to each other in one half range of each division defined by each of the N and S magnetic poles $10_n$, $10_s$ of the permanent magnet 10, the second phase coil 12 having a plurality of groups 14 of conductors C with their individual linear segments 12a extending along generally radial lines adjacent to each other in the other half range of each division defined by each of the N and S magnetic poles $10_n$, $10_s$ of the permanent magnet 10, the first magnetism detector $H_1$ and the second magnetism detector $H_2$, wherein the first and second phase coils 11, 12 are arranged in combination as angularly displaced from each other by the half range of each division defined by each of the N and S magnetic poles $10_n$, $10_s$ of the magnet 10, such that the groups 13,14 of the conductors C are alternately disposed as one adjacent to the other in each division defined by each of the magnetic poles $10_n$ and $10_s$ all through the 360° of the permanent magnet 10, and the first magnetism detector $H_1$ is secured to the end 11c of the first phase coil 11 while the second magnetism detector $H_2$ is secured to the end 12c of the second phase coil 12. The armature 16 is arranged coaxially with the permanent magnet 10 with a predetermined air gap 18 provided therebetween, and is secured to a base 23 of iron by way of an intermediate eddy-current suppressor plate 20 of a magnetizable material having a comparatively high intrinsic electric resistance. The eddy-current suppressor plate 20 is employed as the intermediately located element to suppress the eddy-current, which may otherwise be produced in the coils of the armature 16 when the extremely thin armature 16 preferably of printed coils is directly secured to the base 23 of iron, and which may otherwise lower the output of the motor while increasing the consumed power of the motor. The eddy-current suppressor plate 20 may be a nonmagnetizable ferrite plate or may be a silicon steel lamination coaxially wound up as shown in FIG. 2A as to suppress the eddy-current to thereby increase the output of the motor with a smaller amount of consumed power. The eddy-current suppressor plate 20 of coaxially wound up lamination has a radially extended lamination layer. This may however be formed with the laminations coaxially laminated to provide the radially extended lamination layer as shown in FIG. 2B. The configuration of the eddy-current suppressor plate 20 will not be limited to the ring-shaped one, but may be polygonal including a hexagonal one having the lamination coaxially wound up as shown in FIG. 2C or having the laminations coaxially laminated as shown in FIG. 2D.

The permanent magnet 10 is secured to a rotor yoke 24 of a magnetizable material such as iron, which is in turn secured to a boss 26 fixedly mounted on a rotor shaft 25. The rotor shaft 25 is axially supported by a center radial bearing 29 accommodated in a cover 28 which is secured to the base 23, and is prevented from axial movement by means of a thrust bearing 30. Therefore if a turntable (not shown) is connected to the rotor shaft 25, the flat motor 19 may be used as a phonomotor.

Now in reference to FIGS. 8 through 10, a direct current electric motor 29 of inner-rotor type will be described as a second motor embodiment of the invention. The direct current electric motor 29 of inner-rotor type is composed of a permanent magnet 30 in a form of cylinder having N-magnetic poles N and S-magnetic poles S alternately arranged therearound each adjacent to the other, a first phase coil 31 in a form of cylinder having a plurality of groups 33 of conductors C extended in parallel with each other in one half range of each division defined by each of the N and S-magnetic poles 30n, 30s of the permanent magnet 30, a second phase coil 32 in a form of cylinder having a plurality of groups 34 of conductors C extended in parallel with each other in the other half range of each division defined by each of the N and S-magnetic poles 30n, 30s of the permanent magnet 30, a first magnetism detector $H_1$ and a second magnetism detector $H_2$, wherein the first and second phase coils 33, 34 are formed in a cylinder and arranged in combination as angularly displaced from each other by the half range of each division defined by each of the N and S-magnetic poles 30n, 30s of the permanent magnet 30, such that the conductor groups 33 and 34 are alternately disposed as one adjacent to the other in each division defined by each of the magnetic poles 30n and 30s of the permanent magnet 30, and the first magnetism detector $H_1$ is secured to the end 31c of the first phase coil 31 and the second magnetism detector $H_2$ is secured to the end 32c of the second phase coil 32. Thus the first and second phase coils 31, 32 and the first and second magnetism detectors $H_1$, $H_2$ form a cylindrical armature 36 which is arranged around the cylindrical permanent magnet 30 having a rotor shaft 35 with a predetermined air gap 38 provided therebetween. The armature 36 is secured to the inner periphery of a cylindrical case 43 of a magnetizable material such as an iron by way of an intermediate eddy-current suppressor cylinder 40 which made of a material having a comparatively high intrinsic electric resistance. The cylindrical case 43 is composed of a case body 43a and a cover 43b having a central bearing 39 for rotatably supporting one end of the rotor shaft 35 of the cylindrical permanent magnet 30. The eddy-current suppressor cylinder 40 may be a lamination of silicon steel plates or a plurality of nonmagnetizable ferrite plates as shown.

Figure 11:
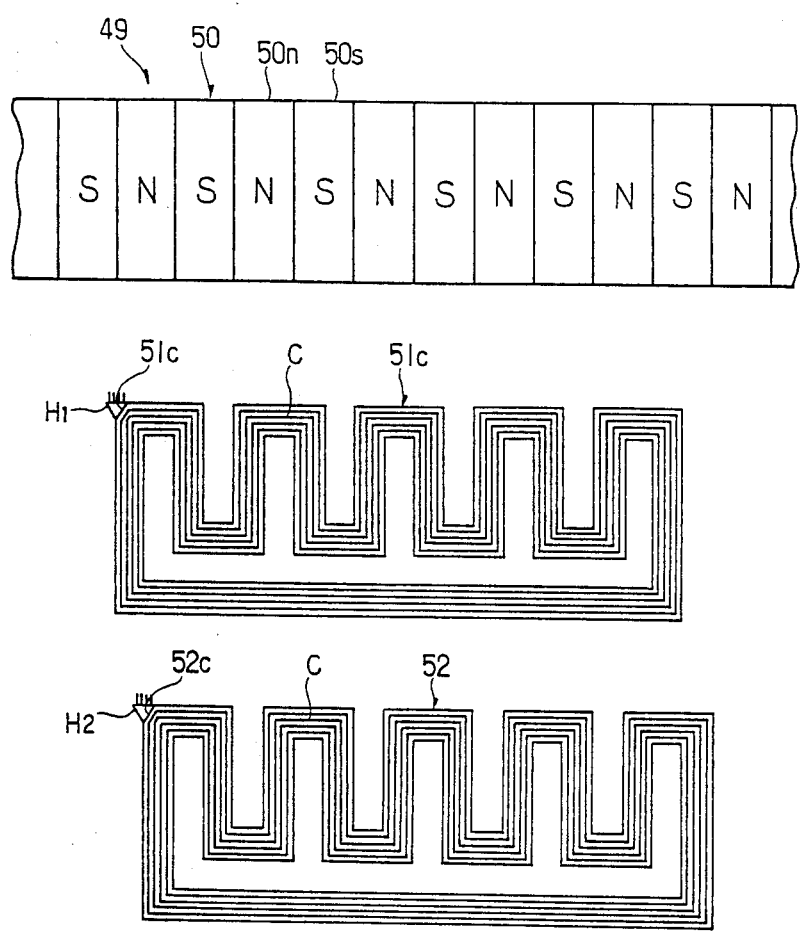
FIG. 11 represents explanatory plan views of a permanent magnet and an armature of the third motor embodiment of the invention.
Figure 12:
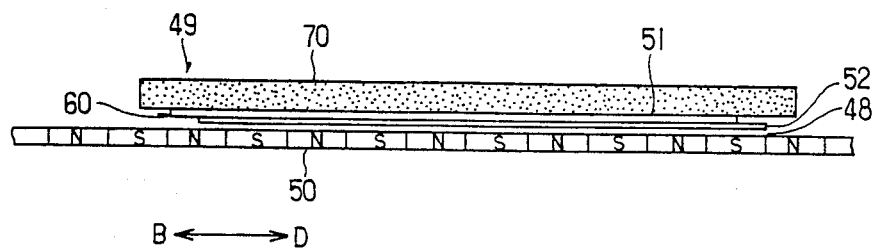
FIG. 12 represents a front elevational view of the third motor embodiment.
Figure 13:
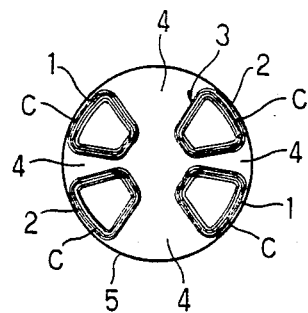
FIG. 13 represents a plan view of a shunt coil arrangement of a prior art.
Figure 14:
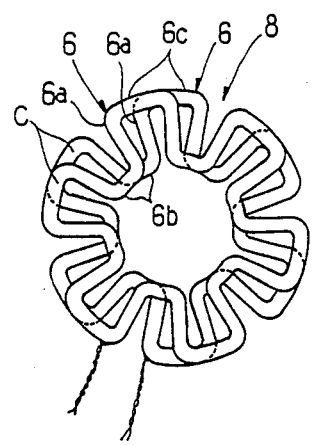
FIG. 14 represents a plan view of a zigzag coil arrangement of another prior art.

In reference to FIGS. 11 and 12 showing a direct current linear electric motor 49, respectively of the components of a direct current linear electric motor and third motor embodiment of the invention, the linear motor 49 is composed of a linear permanent magnet 50 having a plurality of N and S magnetic poles 50n, 50s linearly and alternately arranged all through the length of the magnet, a plurality of groups 51 of first phase conductors C extended in parallel with each other in one half range of each division defined by each of the N and S magnetic poles 50n, 50s of the magnet 50, a plurality of groups 52 of second phase conductors C extended in parallel with each other in the other half range of each division defined by each of the N and S magnetic poles 50n, 50s of the magnet, the first magnetism detector $H_1$ an the second magnetism detector $H_2$, wherein the first and second phase conductors C are set in combination as linearly displaced from each other by the half range of each division defined by each of N and S magnetic poles 50n, 50s of the magnet 50, such that the first and second phase conductors C are alternately disposed as one adjacent to the other in each division defined by each of the N and S magnetic poles 50n, 50s of the magnet 50, and the first magnetism detector $H_1$ is secured to the end 51c of the groups 51 of the first phase conductors and the second magnetism detector $H_2$ is secured to the end 52c of the groups 52 of the second phase conductors C. Thus the groups 51, 52 of the first and second phase conductors C and the first and second magnetism detectors form a linear armature 60 which is arranged opposite to the reciprocatingly movable linear permanent magnet 50 with a predetermined air gap 48 provided therebetween while the linear armature 60 as an eddy-current suppressor plate 70 secured thereto which is made of a material having a comparatively high intrinsic electric resistance.

Figure 3:
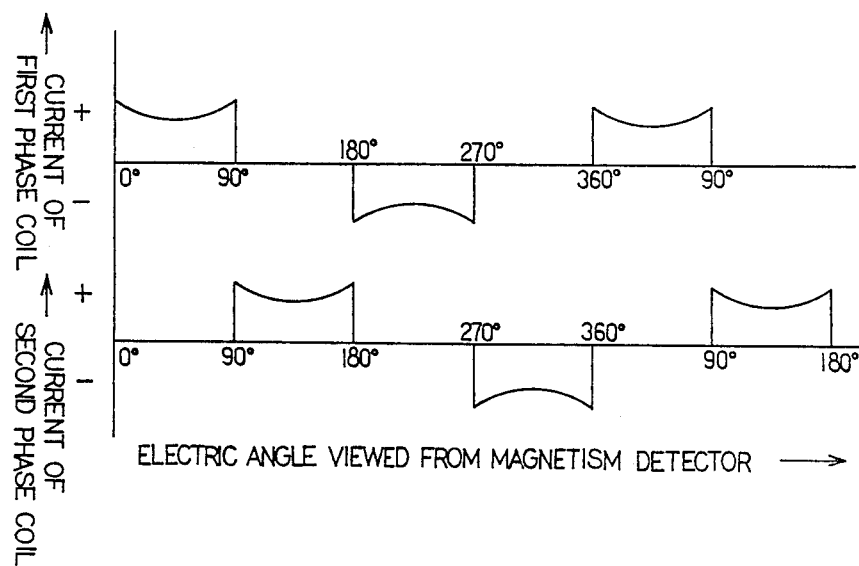
FIG. 3 represents a double phase full wave current flowing through the armature of the invention.
Figure 4:
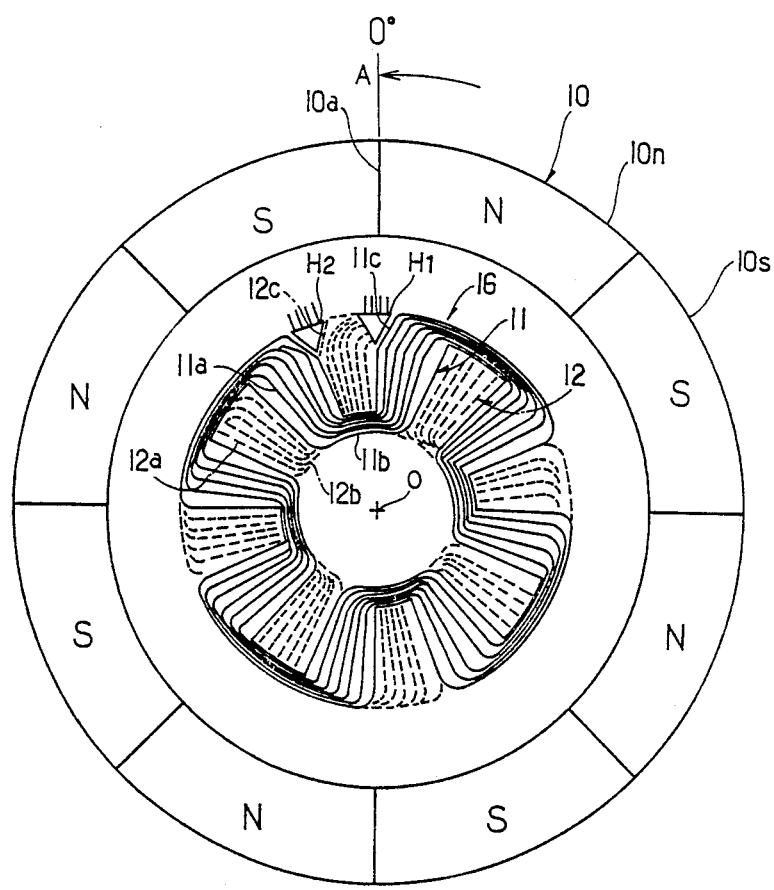
FIGS. 4 through 7 represent the explanatory views showing a series of rotational operations of the first embodiment of the invention.
Figure 5:
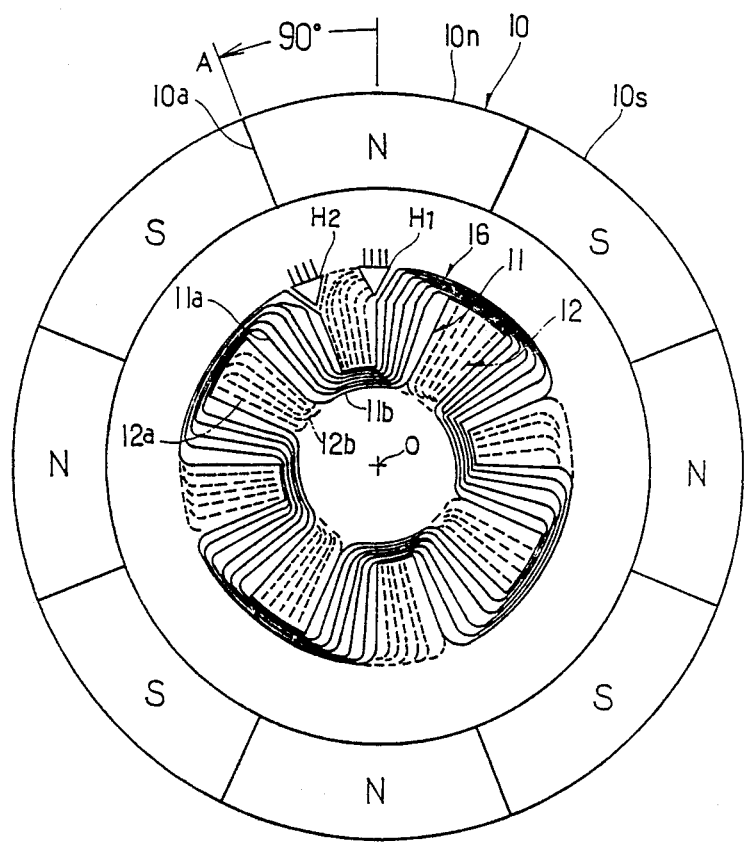

Now in reference to FIGS. 1 through 7, the direct current electric motor 19 of the first embodiment is operated as follows: The permanent magnet 10 having the center axis O and arranged coaxially with the armature 16 with a predetermined air gap provided therebetween is to be assumed to rotate in the counterlockwise direction in FIGS. 2 and 4. A differential double phase full wave current as shown in FIG. 3 is applied to the first and second phase coils 11, 12. As shown in FIG. 4, when a juncture 10a between the S-magnetic pole S and the N-magnetic pole N of the permanent magnet 10 coincides with the electric angle 0°, the first magnetism detector $H_1$ secured to the end 11c of the first phase coil 11 detects the change of magnetism from the S-magnetic pole to the N-magnetic pole and produces a signal. Then the current flows through the groups 13 of conductors C to produce a driving force, and the permanent magnet 10 is rotated in the counterclockwise direction as indicated by an arrow mark A. As shown in FIG. 3, a pulse shape positive full wave current flows through the first phase coil 11 within the range between the electric angles 0° and 90°. As shown in FIG. 5, when the permanent magnet 10 rotates through the electric angle 90° where the juncture 10a etween the N and S-magnetic pole comes to the second magnetism detector $H_2$, the second magnetism detector $H_2$ ceases to detect the magnetism of the S-magnetic pole S and starts to detect the magnetism of the N-magnetic pole N. With this change of magnetism detection, the flow of current through the first phase coil 11 is stopped, and then the pulse shape positive full wave current flows through the second phase coil 12.

Therefore the groups 13, 14 of conductors C will have no reversed torque generated therein and will have a substantially even torque in view of the arrangement of such groups 13, 14 of conductors though it may be admitted that the magnetic flux is stronger at the center of each magnetic pole and is weaker at both ends thereof.

Figure 6:
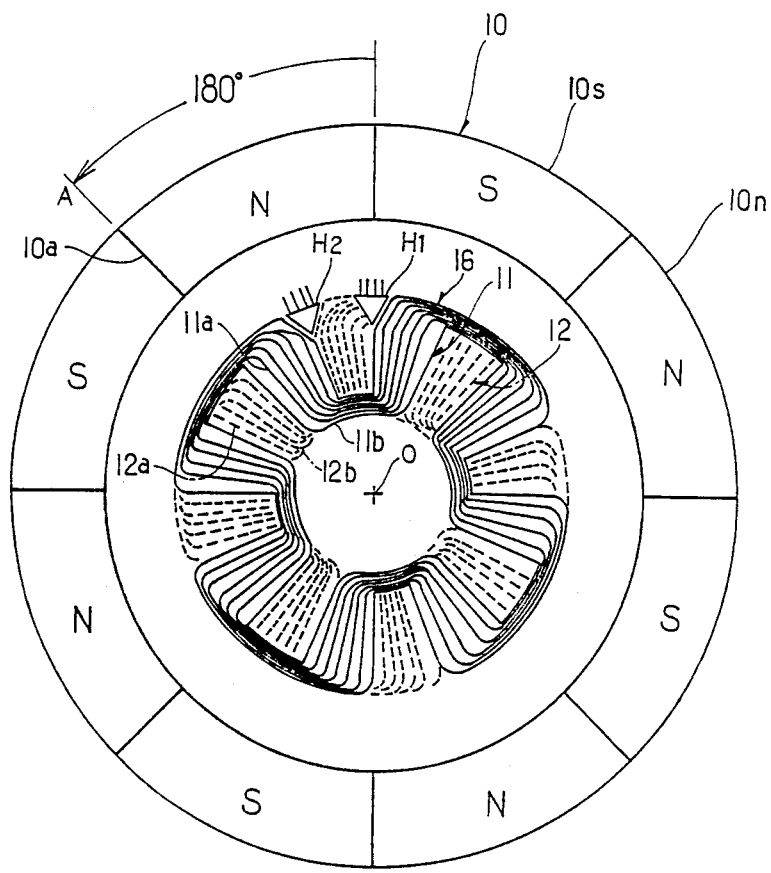
Figure 7:
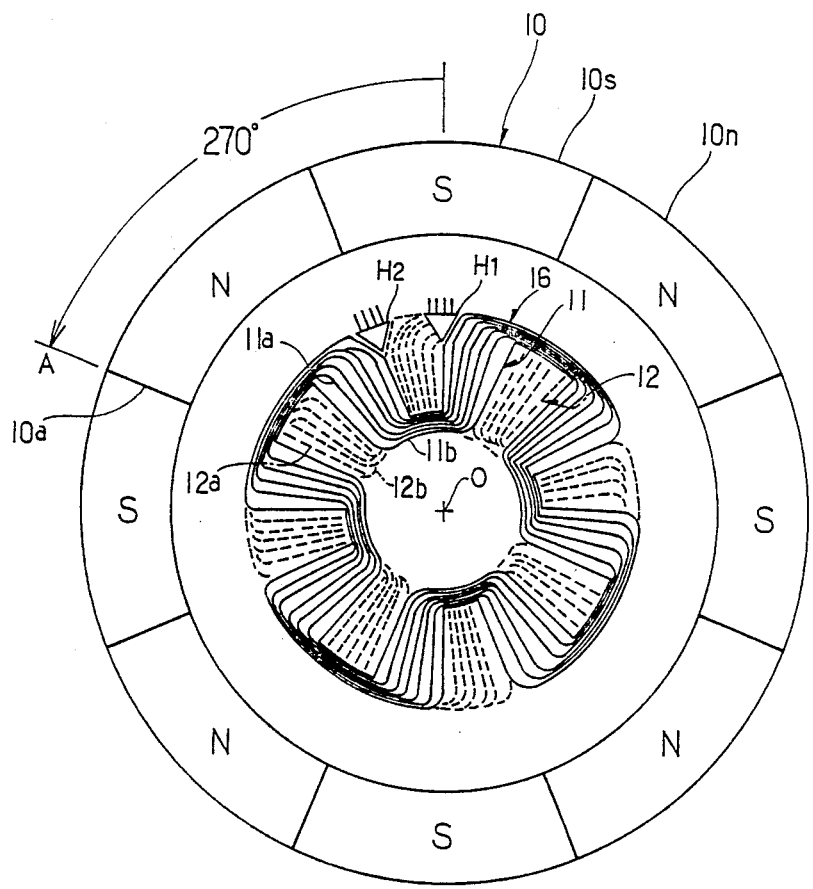

Further when the permanent magnet 10 rotates through the electric angle 180° as shown in FIG. 6, the juncture 10a between the N and S-magnetic poles comes to coincide with the first magnetism detector $H_1$, the first magnetism detector $H_1$ ceases to detect the magnetism of the N-magnetic pole and starts to detect the magnetism of the S-magnetic pole. With this change of magnetic detection, the flow of current through the second phase coil 12 is stopped, and then the pulse shape negative full wave current flows through the first phase coil 11 as shown in FIG. 3. Thus the permanent magnet 10 continuous to rotate in the same direction. Further as shown in FIG. 7, when the permanent magnet 10 rotates through the electric angle 270°, the second magnetism detector $H_2$ detects the magnetism of the S-magnetic pole instead of the N-magnetic pole, and accordingly the current is stopped to flow through the first phase coil 11 and the pulse shape negative full wave current flows through the second phase coil 12. Thus the permanent magnet 10 continuous to rotate constantly in the same direction.

As is apparent from the foregoing description, the first and second-magnetism detectors $H_1$, $H_2$ alternately detect the N and S-magnetic poles N and S to alternately flow the differential positive and negative double phase full wave current through the first and second phase coils 11, 12, to thereby successively produce a driving force in the conductors 11a, 12a of the first and second phase coils 11, 12. In this way, the direct current electric motor 9 of the invention will smoothly rotate with a remarkably strong torque. Moreover as shown, the ineffective conductor portions 11b, 12b are designed to be minimum in contrast to the effective conductor parts 11a, 12a so as to highten the efficiency of the first and second phase coils 11, 12, i.e., to obtain the maximum amount of rotational torque. Further according to this embodiment, the effective conductor parts 11a, 12a are successively operated to constantly and stabilizingly rotate the motor 19 with a minimum consumption of electric power.

Figure 2:
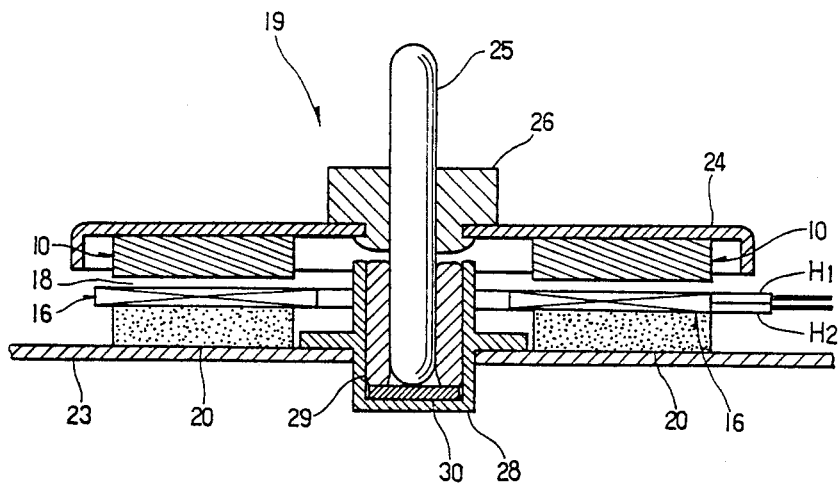
FIG. 2 represents a first motor embodiment of the invention shown in vertical section.
Figure 2A:
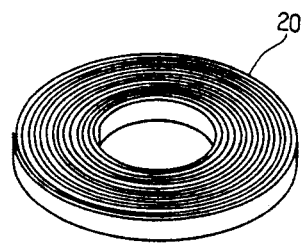
FIG. 2A represents a perspective view of a ring-shaped eddy-current suppressor plate which is made of a lamination coaxially wound up.
Figure 2B:
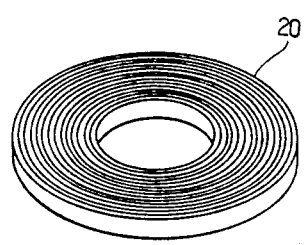
FIG. 2B represents a perspective view of another type of ring-shaped eddy-current suppressor plate made of laminations coaxially laminated.
Figure 2C:
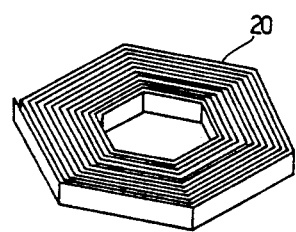
FIG. 2C represents a perspective view of a hexagonal eddy-current suppressor plate made of a lamination coaxially wound up.
Figure 2D:
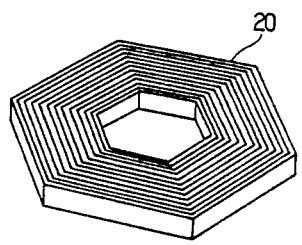
FIG. 2D represents a perspective view of another type of hexagonal eddy-current suppressor plate made of laminations coaxially laminated.

In reference to FIG. 2 the first and second phase coils 11, 12 of the armature 16 may be made up as the printed coils so as to form the armature 16 extremely thin. If the armature 16 is directly attached to the base 23, the eddy-current will be produced in the coils 11, 12, resulting in remarkably lowering the output of the motor 19 while increasing the consumption of electric power. The eddy-current may be prevented from being produced by providing the eddy-current suppressor plate 20 between the armature 16 and the base 23. The eddy-current suppressor plate 20 may be a nonmagnetizable ferrite plate or may be a silicon steel lamination coaxially wound up or coaxially laminated to provide a radially extended lamination layer which will be effective to suppress the eddy-current which may otherwise be produced in the first and second phase coils 11, 12 of the armature 16. As the result, the driving force of the armature 16 is increased while the consumed power of the motor is decreased, in contrast to the case of directly attaching the armature 16 to a base of synthetic resin. The effect of the eddy-current suppressor plate 20 as mentioned above has been actually confirmed in the experiments as a specific feature of such a flat-type direct current electric motor 19.

Figure 8:
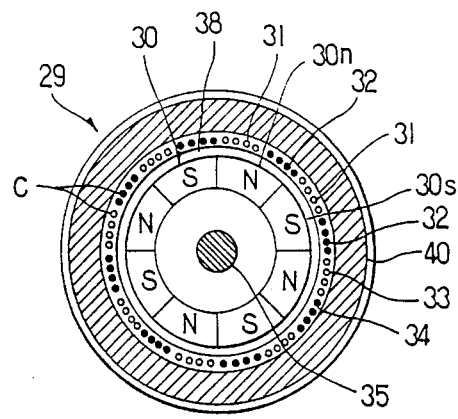
FIG. 8 represents a second motor embodiment of the invention shown in vertical section.
Figure 9:
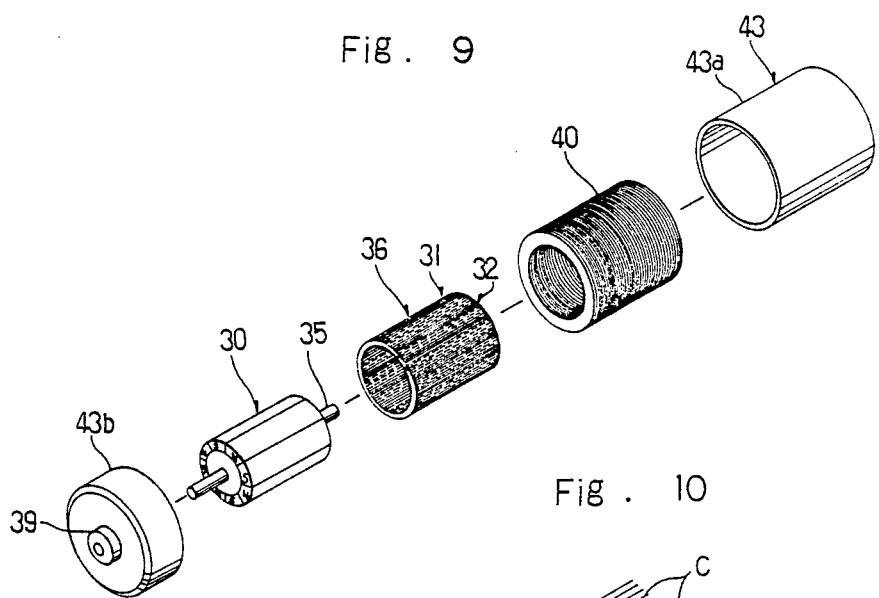
FIG. 9 represents an exploded perspective view of the second motor embodiment.
Figure 10:
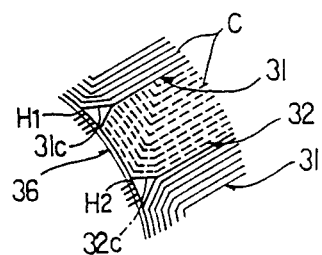
FIG. 10 represents a partly enlarged perspective view of an armature of the second motor embodiment.

In reference to FIGS. 8 through 10 showing the second motor embodiment of the invention, the direct current electric motor 29 of inner-rotor type is same in principle with the first and second embodiments of the invention. According to this embodiment, the armature 36 in the form of cylinder is composed of the first and second phase coils 31, 32 having the first and second magnetism detectors $H_1$, $H_2$ respectively, which are alternately operated to continuously flow the double phase full wave current through the first and second phase coils 31, 32 of the armature 36, to thereby rotate the cylindrical permanent magnet 30 in one direction while the eddy-current suppressor cylinder 40 is operated to suppress the eddy-current which may otherwise be produced in the armature 36. The cylindrical permanent magnet 30 is rotated with the center shaft 35 journalled in the bearing 39 in the case 48. In this embodiment, the cylindrical eddy-current suppressor element 40 is provided to suppress the eddy-current which may otherwise be produced in the armature 36. Therefore an extremely strong torque may be obtained even if the armature 36 is attached to the case 43 of a magnetizable material such as iron for a magnetic circuit. Moreover the rotation of the motor 29 is smooth while the consumption of power is minimum.

In reference to FIGS. 11 and 12 showing the third motor embodiment of the invention, the linear-type direct current electric motor 49 has the linear permanent magnet 50 and the similar armature 60 which are operated in the same principle with the first and second embodiments of the invention. The double phase full wave current flows through the first groups of conductors 51 and the second groups of conductors 52 in the manner as shown in FIG. 3 by the first and second magnetism detectors $H_1$, $H_2$ which alternately detect the magnetism of the N and S-magnetic poles 50n, 50s of the permanent magnet 50. The linear permanent magnet 50 may be linearly moved in the direction as indicated by the arrow mark B or D in dependence upon the control of the linear type direct current electric motor 49. In this case, as the armature 60 is secured to the eddy-current suppressor plate 70, the eddy-current will not be produced in the armature 60 even if the latter is attached to a magnetizable base (not shown) such as an iron base. The armature 60 will produce a strong driving force with a minimum consumption of power.

Having thus set forth the nature of the invention, it will be obvious that the invention may be varied or modified in many ways. Such variations or modifications will not be regarded as a departure from the spirit and scope of the invention, but will be included within the scope of the following claims.

What is claimed is:

1. A direct current electric motor comprising a permanent magnet having a plurality of N-magnetic poles and a plurality of S-magnetic poles arranged thereon, said N and S-magnetic poles being alternately arranged adjacent to each other, each defining a magnetic range of its own; phase coil means including a first phase coil and a second phase coil, each being composed of a plurality of conductors, said conductors each having a plurality of electromagnetic force producing linear segments, each such linear segment being spaced from an adjacent linear segment and oriented generally transverse to the direction of relative movement between said conductors and said permanent magnet, said adjacent linear segments of said conductors of said first phase coil and of said second phase coil, respectively, being arranged in groups of linear conductor segments, said first and second phase coils being displaced by a half range in each magnetic pole of said permanent magnet with each group of linear conductor segments of said first phase coil and each group of linear conductor segments of said second phase coil alternately disposed adjacent to each other, one being disposed in one half of said magnetic range and the other being disposed in the other half thereof; and magnetism detector means including a first magnetism detector and a second magnetism detector, said first magnetism detector being connected to an end of said first phase coil and said second magnetism detector being connected to an end of said second phase coil, and wherein said first and second magnetism detectors and said first and second phase coils form an armature to be positioned opposite to said permanent magnet with a predetermined amount of air gap provided therebetween.

2. A direct current electric motor as defined in claim 1, wherein said first and second phase coils are printed coils.

3. A direct current electric motor as defined in claim 1 comprising a cylindrical case of magnetizable material, an eddy current suppressor cylinder made of magnetizable material having a comparatively high intrinsic resistance, said eddy current suppressor cylinder being secured to said cylindrical case, said phase coil means and said detector means providing a cylindrical armature secured to said eddy current suppressor cylinder, and wherein said permanent magnet if of cylindrical form dimensioned to provide said predetermined amount of air gap with said cylindrical armature, thereby to provide an inner-rotor type electric motor configuration.

4. A direct current electric motor as defined in claim 1, comprising a linear base of magnetizable material, a linear eddy current suppressor plate made of magnetizable material having a comparatively high intrinsic resistance, said eddy current suppressor plate being secured to said base, said phase coil means and said detector means providing a linear armature secured to said eddy current suppressor plate, said permanent magnet being linear in form and movable linearly with respect to said armature while spaced therefrom by said predetermined amount of air gap, thereby provide a linear electric motor configuration.

5. A direct current electric motor of flat type comprising a permanent magnet having a plurality of N-magnetic poles and a plurality of S-magnetic poles being alternately arranged adjacent to each other, each defining a magnetic range of its own; phase coil means including a first phase coil and a second phase coil, each being composed of a plurllity of conductors, said conductors each having a plurality of linear segments being extended along generally radial lines extending from a rotation axis of said permanent magnet with a predetermined space provided between adjacent linear segments, said adjacent linear segments of said conductors of said first phase coil and of said second phase coil, respectively, being arranged in groups of linear conductor segments, said first and second phase coils being displaced by a half range in each magnetic pole of said permanent magnet with each group of linear conductor segments of said first phase coil and each group of linear conductor segments of said second phase coil alternately disposed adjacent to each other, one being disposed in one half of said magnetic range and the other being disposed in the other half thereof; and magnetism detector means including a first magnetism detector and a second magnetism detector, said first magnetism detector being connected to an end of said first phase coil and said second magnetism detector being connected to an end of said second phase coil, said first and second magnetism detectors and said first and second phase coils forming an armature to be positioned opposite to said permanent magnet with a predetermined amount of an air gap provided therebetween.

6. A direct current electric motor as defined in claim 5, further comprising:
an eddy-current suppressor plate for securing said armature thereto.

7. A direct current electric motor as defined in claim 6, wherein said eddy-current suppressor plate is made of a magnetizable material having a comparatively high intrinsic resistance.

8. A direct current electric motor as defined in claim 6, wherein said eddy-current suppressor plate is made of a nonmagnetizable ferrite plate.

9. A direct current electric motor as defined in claim 6, wherein said eddy-current suppressor plate is a lamination layer of a magnetizable material including silicon steel plates.

10. A direct current electric motor as defined in claim 6, further comprising:
a base of a magnetizable material for securing said eddy-current suppressor plate.

11. A direct current electric motor as defined in claim 1, wherein said permanent magnet and said armature are made in a ring-shaped configuration.

12. A direct current electric motor of flat type comprising a permanent magnet having a plurality of N-magnetic poles and a plurality of S-magnetic poles arranged thereon, said N and S-magnetic poles being alternately arranged adjacent to each other, each defining a magnetic range of its own; phase coil means including a first phase coil and a second phase coil, each being composed of a plurality of conductors, said conductors each having a plurality of linear segments being extended along generally radial lines extending from a rotational axis of said permanent magnet with a predetermined space provided between adjacent linear segments, said adjacent linear segments of said conductors of said first phase coil and of said second phase coil, respectively, being arranged in groups of linear conductor segments, said first and second phase coils being displaced by a half range in each magnetic pole of said permanent magnet with each group of linear conductor segments of said first phase coil and each group of linear conductor segments of said second phase coil alternately disposed adjacent to each other, one being disposed in one half of said magnetic range and the other being disposed in the other half thereof; magnetism detector means including a first magnetism detector and a second magnetism detector, said first magnetism detector being connected to an end of said first phase coil and said second magnetism detector being connected to an end of said second phase coil, said first and second magnetism detectors and said first and second phase coils forming an armature to be positioned opposite to said permanent magnet with a predetermined amount of an air gap provided therebetween; eddy-current suppressor means including an eddy-current suppressor plate for securing said armature thereto, said eddy-current suppressor plate being made of a magnetizable material including a silicon steel lamination coaxially wound up or laminated to provide a radially extended lamination layer; and a base of a magnetizable material for securing said eddy-current suppressor plate thereto.

* * * * *

UNITED STATES PATENT AND TRADEMARK OFFICE
CERTIFICATE OF CORRECTION

PATENT NO. : 4,794,293

DATED : December 27, 1988

INVENTOR(S) : Kiyonori Fujisaki et al

It is certified that error appears in the above-identified patent and that said Letters Patent is hereby corrected as shown below:

Column 11, line 1, "if" should be --is--.

Signed and Sealed this

Ninth Day of May, 1989

Attest:

DONALD J. QUIGG

Attesting Officer

Commissioner of Patents and Trademarks